United States Patent
Kaufman et al.

[15] 3,645,546
[45] Feb. 29, 1972

[54] SEALING RING

[72] Inventors: Samuel Kaufman, Tappan, N.Y.; Donald E. De Rocker, Ramsey, N.J.; Herbert A. Conrad, Tappan, N.Y.

[73] Assignee: Sier-Bath Gear Co., Inc., North Bergen, N.J.

[22] Filed: Mar. 29, 1971

[21] Appl. No.: 128,793

Related U.S. Application Data

[63] Continuation-in-part of Ser. No. 813,146, Apr. 3, 1969.

[52] U.S. Cl. ............................................. 277/205, 277/30
[51] Int. Cl. ................................................... F16j 15/16
[58] Field of Search ...................... 277/30, 205, 235, 212 FB; 74/18, 18.1, 18.2

[56] References Cited

UNITED STATES PATENTS

| | | | |
|---|---|---|---|
| 1,885,046 | 10/1932 | Bennett | 277/30 |
| 2,692,783 | 10/1954 | Foss | 277/235 |
| 2,974,501 | 3/1961 | Kaufman et al. | 277/205 |
| 3,039,779 | 6/1962 | Laird | 277/30 |
| 3,429,599 | 2/1969 | Schmidt | 277/212 FB |

*Primary Examiner*—Robert L. Smith
*Attorney*—Howard C. Miskin

[57] ABSTRACT

A ring for effecting a fluidtight seal between the confronting peripheral faces of relatively universally movable sleeve and shaft comprises an annular elastomeric body member including an intermediate section having a length between said peripheral faces of said sleeve and shaft sufficiently greater than the distance between said peripheral faces to accommodate the maximum misalignment of said sleeve and shaft without breaking the seal. In a preferred embodiment, the intermediate section is defined by converging conical walls joined at a circular elbow permitting movement of the walls about the elbow. Flanges projecting from the free edges of the walls and self-hinged thereto have annular channels in which are nested rigid coplanar annuli. The inner flange tightly engages the shaft surface and the outer flange is restrained between shoulders on the sleeve.

10 Claims, 4 Drawing Figures

Patented Feb. 29, 1972  3,645,546

INVENTORS
SAMUEL KAUFMAN
DONALD E. DE ROCKER
HERBERT A. CONRAD

BY Howard C. Miskin
ATTORNEY

SEALING RING

REFERENCE TO RELATED APPLICATION

The present invention is a continuation-in-part of copending Patent application Ser. No. 813,146 filed Apr. 3, 1969.

BACKGROUND OF THE INVENTION

The present invention relates generally to improvements in sealing devices, and it relates particularly to an improved device for producing a fluidtight seal between cylindrical surfaces, one within the other, which relatively angularly vary with time.

It is frequently desirable to effect a fluidtight seal between a cylindrical rod, such as a shaft or the like, and an encircling sleeve or collar, where the angle between the sleeve and shaft changes with time, often rapidly and cyclically. A common mechanism of this type is encountered in self-aligning gear-type flexible shaft couplings, which often have torques and misaligning stresses applied. Such coupling generally includes an outer sleeve and an inner shaft engaging hub coupled to the sleeve for rotation therewith, while permitting relative angular movement therebetween. It is desirable to effect a fluidtight seal between the hub and sleeve to prevent the leaking of any lubricant, which usually packs the space delineated by the sleeve and hub surfaces. Many types of sealing rings and like devices have been employed for achieving fluidtight seals in rotating self-aligning couplings, but these possess numerous drawbacks and disadvantages. The seals effected thereby are frequently defective and of little durability, and oftentimes cannot withstand the centrifugal forces caused by high speeds of the shaft or the thrust loads exerted by the retaining elements. They are also generally complicated and difficult to apply and easily damaged by gouging and abrasion. A limited self-aligning coupling sealing ring, which has been generally satisfactory is described in U.S. Pat. No. 2,974,501, granted Mar. 14, 1961 to S. S. Kaufman et al. However, this sealing device leaves something to be desired under many operating conditions.

SUMMARY OF THE INVENTION

It is thus a principal object of the present invention to provide an improved device for effecting a fluidtight seal between relative moveable members.

Another object of the present invention is to provide an improved sealing ring for use between relative angularly and axially moveable cylindrical surfaces.

Still another object of the present invention is to provide an improved sealing ring for self-aligning flexible shaft couplings.

A further object of the present invention is to provide an improved self-aligning flexible shaft coupling sealing ring for retaining lubricant within the coupling under a wide range of operating conditions and to withstand thrust loads.

Still a further object of the present invention is to provide a sealing ring of the above nature, which is easy and convenient to assemble, and is characterized by its ruggedness, reliability, durability, simplicity, high versatility and adaptability.

The above and other objects of the present invention will become apparent from a reading of the following description taken in conjunction with the accompanying drawing, which illustrates a preferred embodiment thereof.

In a sense the present invention contemplates the provision of a sealing device comprising coaxial relatively rigid inner and outer rings of lesser and greater diameters, respectively, which confront and seal peripheral faces of relatively universally moveable sleeve and shaft, respectively, and a flexible, resilient body member interconnecting said rings having a length between said inner and outer rings greater than the distance between said inner and outer rings so as to form a flexible surface to allow free flexibility of the rings to accommodate the maximum misalignment of the sleeve and shaft, without causing a strain on the body member, which could urge one of the said rings out of sealing contact with its respective surface. The present invention permits relative universal movement of the rings and in one form includes inner and outer peripheral sections secured to said inner and outer rings, respectively, and an intermediate section integrally formed with and hinge-connected along its borders to said peripheral sections, said peripheral sections being relatively translationally and angularly moveable. The intermediate member is resilient and flexible and is of a length greater than the distance between the inner and outer rings so as to accommodate the maximum misalignment of the surfaces to be sealed without causing a strain on the intermediate section which could cause one or both of the rings to move away from their respective sealing surfaces.

According to a preferred embodiment of the present invention, the body member is formed of an elastomeric material and comprises an accordion-pleat-shaped intermediate portion, including conically shaped walls converging to a hinge defining a circular elbow, and annular flanges integrally formed with and hinged to the outer peripheral edges of the conical walls. The flanges have annular channels formed therein in which flat-faced rigid annuli are imbedded. As applied to a self-aligning gear coupling, the outer flange is restrained, between an annular shoulder and a lock ring located on the inner face of the coupling sleeve and the inner flange encircles and tightly embraces the hub and is maintained in such state by the corresponding rigid annulus.

The improved ring seal overcomes the drawbacks and disadvantages of the seals heretofore available. The flexibility of the seal and the relationship of the sections thereof by readily expanding and contracting in response to movement of the coupling elements allow the rapid unimpeded relative movement of the coupling elements, while retaining any lubricant therein. The seal permits rapid local variations in lubricant volume without any pumping of the lubricant past the seal, and can resist thrust loads, abrasion and gouging. The improved sealing ring is rugged, versatile, adaptable, easy to apply and of great durability under a wide range of operating conditions.

DESCRIPTION OF THE PREFERRED EMBODIMENT

Figure 1:
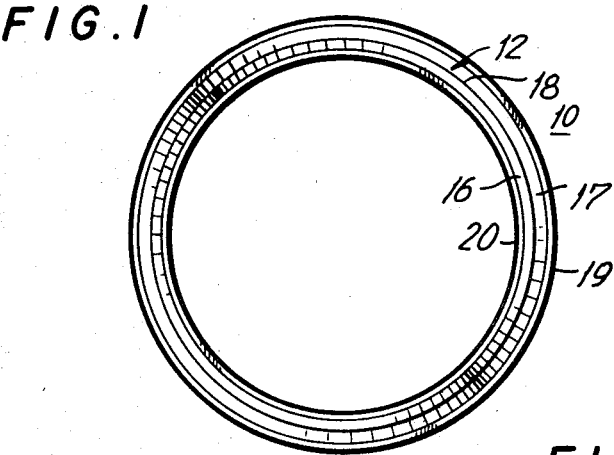
FIG. 1 is a plan view of a sealing ring embodying the present invention.
Figure 2:
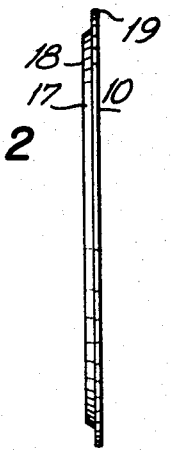
FIG. 2 is a side elevational view thereof.

Referring now to the drawing which illustrates a preferred embodiment of the present invention, the reference numeral 10 generally designates the improved sealing ring for use with a self-aligning gear-type, flexible shaft coupling 11. The sealing ring 10 comprises a circular body member 12 of a flexible resilient material and a pair of inner and outer relatively rigid rings 13 and 14, respectively secured to the inner and outer borders of body member 12. Body member 12 is advantageously integrally formed of an elastomeric material, preferably a synthetic rubber or the like, such as "Viton," Silicone rubber, "Buna N" and other materials which are resistant to and withstand the conditions to which the sealing ring is exposed, such as high- and low-temperature ranges, lubricants of various types, and different ambient conditions. The dimensions of body member 12 and rings 13 and 14 are dependent upon the corresponding dimensions of associated coupling.

Body member 12 comprises an accordion-pleat-shaped intermediate section, including inner and outer walls 16 and 17, respectively, which in their unstressed condition are conically shaped and converge inwardly at a mutual angle, preferably of less than 90°, to a circular hinge defining elbow 18. Walls 16 and 17 are of a thickness which is substantially uniform and relatively thin. Integrally formed with and directed outwardly from the free edge of wall 17 is a peripheral flange 19 having an annular channel formed in the rear face thereof in the direction of the elbow 18. Similarly, integrally formed with and directed inwardly from the free edge of wall 16 is a peripheral flange 20 having an annular channel formed in the rear face thereof in the direction of elbow 18. It should be noted that the flanges 19 and 20 are swingable about the junction lines thereof with the walls 17 and 16, respectively, which junction lines define self hinges, flanges 19 and 20 being substantially coaxial and coplanar in the unstressed condition of sealing ring 10.

Ring or annulus 14 nests in the channel in flange 19 and is formed of a metal such as steel or other suitable rigid material, and is secured in flange 19 by being molded therein or bonded thereto by a suitable adhesive or otherwise secured in position. The front and rear faces of ring 14 are parallel and flat. Ring 13 is of lesser diameter than ring 14 and is likewise formed of a metal such as steel or other suitable rigid material, and is nested in the channel in flange 20 and molded, bonded, or otherwise secured therein. The inner periphery of ring 13 is advantageously cylindrical.

Coupling 11 is of generally known construction and includes a coupling sleeve 21 provided on its inner face with longitudinally extending splines or teeth 22 spaced from seal of the sleeve 21. A first hub 23 projects into one end of sleeve 21 and is provided with linear splines 24 interdigitating splines 22 to effect a coaxial coupling between hub 23 and sleeve 21. A shaft 25 has an end registering with hub 23 and is suitably locked against rotation by a key 26 registering with opposing keyways in hub 23 and shaft 25. Secured to the inner end of shaft 25 is a circular retaining plate 27, the peripheral border of which registers with an annular shoulder formed in the inner corner periphery of hub 23. An O-ring 28 located in an annular groove in hub 23 engages the cylindrical inside face of sleeve 21 to effect a fluidtight seal between hub 23 and sleeve 21.

A second hub 29 projects into the other end of coupling sleeve 21 and includes an enlarged inner head section 30 provided with arcuately shaped teeth 32, which interdigitate splines 22, so that sleeve 21 and hub 29 rotate in unison, but hub 29 is universally swingable about transverse axes relative to sleeve 21. The outer section 33 of hub 29 has an outside cylindrical face, which is radially spaced from the inside face of the sleeve 21. The bore of the outer end of sleeve 21 in the area of hub 29 and beyond splines 22 is enlarged and cylindrically shaped and a spacer bushing 34 registers with the enlarged bore and abuts the proximate ends of splines 22. An end section of shaft 36 projects into hub 29 and is affixed thereto by a key 37 engaging confronting keyways in hub 29 and shaft 36, the inner end face of shaft 36 being provided with a well that engages the shank of a round faced button 38, which confronts a projecting face of retaining plate 27.

Sealing ring 10 is positioned in sleeve 21 with walls 16 and 17 thereof converging inwardly and ring 14 abutting the outer end face of bushing 34. An annular lock ring assembly 39 tightly abuts the outer face of sealing ring flange 19, and its outer border engages an annular groove formed in the inside face of sleeve 21 outwardly of bushing 34. The peripheral edge of flange 19 tightly engages the inside face of sleeve 21 and flange 19 and ring 14 are tightly embraced by the confronting faces of ring assembly 39 and bushing 34 to effect a fluidtight seal. The inside peripheral face of flange 20 tightly engages the outside face of hub section 33 and is retained thereto by ring 13 to ensure a fluidtight seal between sealing ring 10 and hub 33 and hence of the entire coupling assembly 11. Bushing 34 resists any end thrust loads bearing against sealing ring 10 during operation, by bearing against ring 14, which faces towards gear teeth 22.

Figure 3:
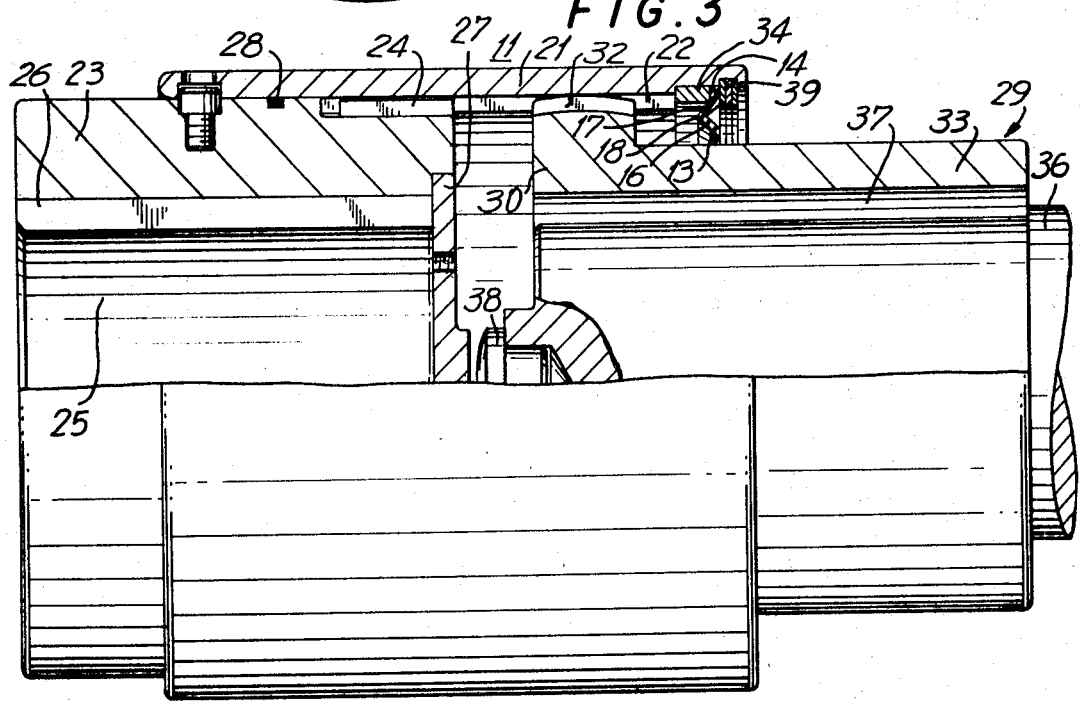
FIG. 3 is an enlarged front-elevational view, partially in section, of a self-aligning gear-type, flexible shaft coupling, employing the improved sealing ring illustrated with the coupling sleeve and hub in a coaxially aligned condition.
Figure 4:
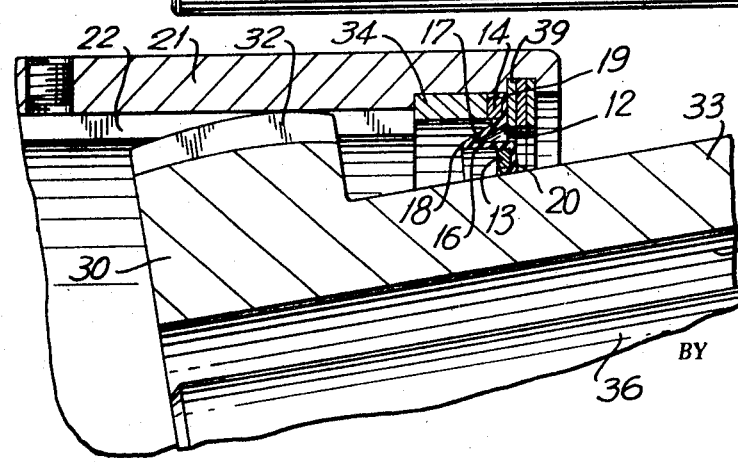
FIG. 4 is an enlarged fragmentary view thereof, with the coupling sleeve and hub in a nonaligned angular relationship.

As can be seen in FIGS. 3 and 4 of the drawing, hub 29 is free to move axially, radially and angularly about transverse axes relative to coupling sleeve 21, without disturbing the fluidtight seal effected by sealing ring 10. In operation, sometimes shaft 36 is not precisely aligned with shaft 25 creating misaligning stresses. By reason of the unique construction of sealing ring 10 and the configuration of body member 12, there is no impediment or interference with the aforesaid relative movement between sleeve 21 and hub 29, even with severe misalignment, such as illustrated in FIG. 3. As shown, walls 16 and 17 are flexed about elbow 18, but flanges 19 and 20 remain in sealing relation with their corresponding surfaces of the coupling assembly 11. Ring 14 is maintained in fixed position by spacer 34 and ring assembly 39.

During operation of the coupling, one coupling element moves axially with respect to the other and occasionally causes internal pressure buildup in the lubricant contained within the coupling, oftentimes rapidly. Local variations in the volume and configuration of the lubricant is rapidly accommodated by changes in the shape of the sealing ring body member intermediate section without disturbing the seal or blowing out the ring body member, and such accommodation relieves excessive lubricant pressures and obviates pumping and leaking of lubricant past the seal. Occasionally a rapid pressure buildup causes a surge of lubricant which inverts the intermediate section of the seal and dissipates the pressure. Moreover, the sealing ring can withstand very rapid and cyclical changes without any damage or deterioration, thereby contributing to its great durability. Further, rings 13 and 14 increase the resistance to thrust loads and abrasion and gouging of spacers and lock rings.

While there has been described and illustrated a preferred embodiment of the present invention, it is apparent that numerous alterations, omissions and additions may be made without departing from the spirit thereof. For example, rings 13 and 14 may be of different transverse cross sections and they may be completely embedded and enclosed in the elastomeric body member. Moreover, walls 17 and 16 may be of somewhat different cross section and relationship than that specifically illustrated, provided they satisfy the conditions described above. Also, in nonstressed condition, rings 13 and 14 may be transversely offset from each other in parallel planes. Further, body member 12 may be formed of other synthetic rubbers such as Buna N and Neoprene. While ring 34 and ring 14 are shown as being separate, they may be formed integrally, and as a unitary piece.

It is apparent that the flexible body member of the sealing device must be of a length greater than the distance between the surfaces to be sealed so as to accommodate the maximum misalignment expected of the surfaces to cause no strain on the intermediate section of the body which could cause separation of the inner and outer rings from their corresponding sealed surfaces. The flexible intermediate surface being of a length greater than the distance between the rings could take various shapes, such as curved, bowed, serpentine or accordion-pleated as shown.

What is claimed is:

1. A sealing device comprising coaxial, substantially coplanar inner and outer rings formed of a relatively rigid material and of lesser and greater diameters, respectively, and a flexible body member interconnecting said rings to permit relative universal movement thereof and including an intermediate section between said rings having a length greater than the distance between said inner and outer rings during their sealing operation to accommodate maximum translational and angular misalignment of said inner and outer rings without causing the said rings to move from their sealing surfaces in response to strain on the intermediate section accommodating to the said misalignment, said intermediate section having a hinge portion said body member interconnected to said rings thereby being relatively translationally and angularly moveable.

2. A sealing device of claim 1, wherein said intermediate section is serpentine in shape between said inner and outer rings.

3. A sealing device of claim 1, wherein said body member hingedly interconnects said rings and includes inner and outer peripheral sections secured to said inner and outer rings, respectively, and an intermediate section integrally formed with and hinged connected along its borders to said peripheral sections and having a further hinge intermediate of its borders.

4. The sealing device of claim 3, wherein said intermediate section comprises converging inner and outer walls joined at said further hinge, said further hinge being an elbow permitting the relative movement of said inner and outer walls.

5. The sealing device of claim 4, wherein the inner and outer walls of the intermediate section converge interiorly.

6. The sealing device of claim 2, wherein said peripheral sections comprise annular flanges directed inwardly and outwardly from the inner and outer edges, respectively, of said intermediate section and having annular channels formed therein, said rings nesting in said channels.

7. The sealing device of claim 3, wherein said intermediate section comprises converging inner and outer conical walls of substantially uniform thickness joined at an elbow permitting the swinging of said walls about said elbow, said peripheral sections comprising annular flanges directed inwardly and outwardly from the peripheral edges of said inner and outer walls, respectively, and having annular channels formed therein, said rings comprising nesting in said channels.

8. The sealing device of claim 7, wherein said outer ring comprises a flat faced annulus.

9. The sealing device of claim 1, wherein said body member is formed of an elastomeric material.

10. The sealing device of claim 1, wherein said body member intermediate section comprises an annular accordion-pleat.

* * * * *